United States Patent
Tazoniero et al.

(10) Patent No.: US 12,552,430 B1
(45) Date of Patent: Feb. 17, 2026

(54) RAILWAY SYSTEM PLANNING WITH DISTURBANCE PROPAGATION

(71) Applicant: Progress Rail Locomotive Inc., LaGrange, IL (US)

(72) Inventors: Alexandre Tazoniero, Curitiba (BR); Marcos Blanco Fernandes, Trophy Club, TX (US); Fernando Antonio Campos Gomide, Campinas (BR); Rodrigo Almeida Goncalves, Campinas (BR); Thiago Cantos Lopes, Curitiba (BR)

(73) Assignee: Progress Rail Locomotive Inc., LaGrange, IL (US)

( * ) Notice: Subject to any disclaimer, the term of this patent is extended or adjusted under 35 U.S.C. 154(b) by 8 days.

(21) Appl. No.: 18/805,915

(22) Filed: Aug. 15, 2024

(51) Int. Cl.
  *B61L 27/57* (2022.01)
  *B61L 27/16* (2022.01)
(52) U.S. Cl.
  CPC ............... *B61L 27/57* (2022.01); *B61L 27/16* (2022.01)
(58) Field of Classification Search
  CPC .................................. B61L 27/57; B61L 27/16
  See application file for complete search history.

(56) References Cited

U.S. PATENT DOCUMENTS

| | | | | |
|---|---|---|---|---|
| 2017/0324684 A1* | 11/2017 | Dharmapalan | ...... | G06Q 10/107 |
| 2021/0122402 A1* | 4/2021 | Böhm | ............ | B61L 23/045 |
| 2021/0269077 A1* | 9/2021 | Speckmeier | ............ | B61L 27/57 |
| 2022/0051515 A1* | 2/2022 | Schmidt | ................ | G06Q 10/02 |
| 2023/0219604 A1* | 7/2023 | Hernandez Canseco | | B61L 27/16 701/19 |
| 2023/0222271 A1* | 7/2023 | Spackova | ............... | G06F 30/23 703/1 |

* cited by examiner

*Primary Examiner* — Sizo B Vilakazi

(57) ABSTRACT

System and methods for determining a propagation of delays. In some embodiments, a computer system includes: a processor; a non-transitory computer readable medium that stores instructions that when executed by the processor causes the processor to execute operations. The operations may include receiving first information related to a first stop by a first train on a first track and receiving second information related to a second stop by a second train on the first track. The operations may further include determining an association between the duration of the second stop of the second train and the reason for the first stop of the first train and displaying an indication of the association on a graphical user interface. Lastly, the operations may include determining an updated association between the first stop and second stop based on a user input into the graphical user interface.

20 Claims, 5 Drawing Sheets

RAILWAY SYSTEM PLANNING WITH DISTURBANCE PROPAGATION

TECHNICAL FIELD

The present disclosure generally to managing a railway system, and more particularly, to determining and diagnosing disturbances that may occur during operation and the propagated impacts of disturbances across a railway system.

BACKGROUND

A singular railway often services multiple trains traveling in opposite directions. To do so, a singular main line may incorporate a plurality of sidings which allow for trains to pass one another without collision. Therefore, maintaining and operating a consistent schedule is crucial to avoiding delays. However, due to the volume and unexpected nature of railway and train operations, it is inevitable that delays may occur. These delays result in a propagation of consequences or stops for trains follow behind the subsequent delay. For example, a train which stops due to mechanical failure on the main line will cause trains traveling in both directions to also encounter a stop or a delay. Therefore, due to the spiderwebbing nature of these delays it can be particularly challenging to determine which initial stop or stops caused which subsequent delays, resulting in a challenging analysis of where the causation for delays may reside.

Current solutions rely upon the expertise of an assessor or operator to trace each of these initial stops and the resulting subsequent stops manually, often times by hand. The resulting process is time consuming and inefficient. Furthermore, due to the manual nature of the task, the results may be inconsistent due to varying experience levels, opinions, and generational discretion of each of the assessors. Therefore, there is an interest in creating a more uniform and efficient method for tracing the propagation of delays which may stem from an initial stop.

Some efforts have been made to use automatic processes for monitoring railway data. For example, US Publication No. 2021/269077 to Speckmeier et al. ("the '077' patent") describes a method and system for automatically transferring sensor data relating to railway infrastructure. The '077' patent specifically uses an analytical approach, such as machine learning, to further analyze the data collected and maintained within the sensor data by classifying the data to predict possible future health statuses of the railway. However, the system and method described in '077 have some deficiencies. For example, the '077 patent does not include details or features directed towards detecting or determining a propagation of delays which may extend from a singular stop. Furthermore, the '077 patent fails to discuss how the sensor information and analytical approach may be able to create relationships or associations between each of the trains and their stops.

Examples of the present disclosure are directed to overcoming deficiencies of such systems.

SUMMARY

In one aspect of the present disclosure, computer system for determining a propagation of delays, the computer system including: a processor; a non-transitory computer readable medium that stores instructions that when executed by the processor causes the processor to execute operations including: receiving first information related to a first stop by a first train on a first track, wherein the first information includes a reason for the first stop; receiving second information related to a second stop by a second train on the first track, wherein the second information includes a duration of the second stop; determining an association between the duration of the second stop of the second train and the reason for the first stop of the first train; displaying an indication of the association on a graphical user interface; and determining an updated association between the duration of the second stop of the second train and the first stop of the first train based on a user input into the graphical user interface.

In another aspect of the present disclosure, a computer-implemented method for determining a propagation of delays, the method including: receiving first information related to a first stop by a first train on a first track, wherein the first information includes a reason for the first stop; receiving second information related to a second stop by a second train, wherein the second information includes a duration of the second stop on the first track; determining an association between the duration of the delay of the second stop of the second train and the reason of the first stop of the first train; displaying an indication of the association on a graphical user interface; and determining an updated association between the duration of the delay of the second stop of the second train and the reason of the first stop of the first train based on a user input into the graphical user interface.

In still another aspect of the present disclosure, a computer system for determining a propagation of delays, the computer system including: a processor; a non-transitory computer readable medium that stores instructions that when executed by the processor causes the processor to execute operations including: receiving first information related to a plurality of first stops by a first plurality of trains on a first track, wherein the first information includes a reason for each of the first stops; receiving second information related to a plurality of second stops by a second plurality of trains on the first track, wherein the second information includes a duration of each of the second stops; determining at least one association between the reason for each of the plurality of first stops and the duration of at least one second stop of the plurality of second stops; displaying an indication of the at least one association on a graphical user interface; and determining at least one updated association between the plurality of first stops and the duration of at least one second stop of the plurality of second stops based on a user input into the graphical user interface.

DETAILED DESCRIPTION

Wherever possible, the same reference numbers will be used throughout the drawings to refer to same or like parts.

Figure 1:
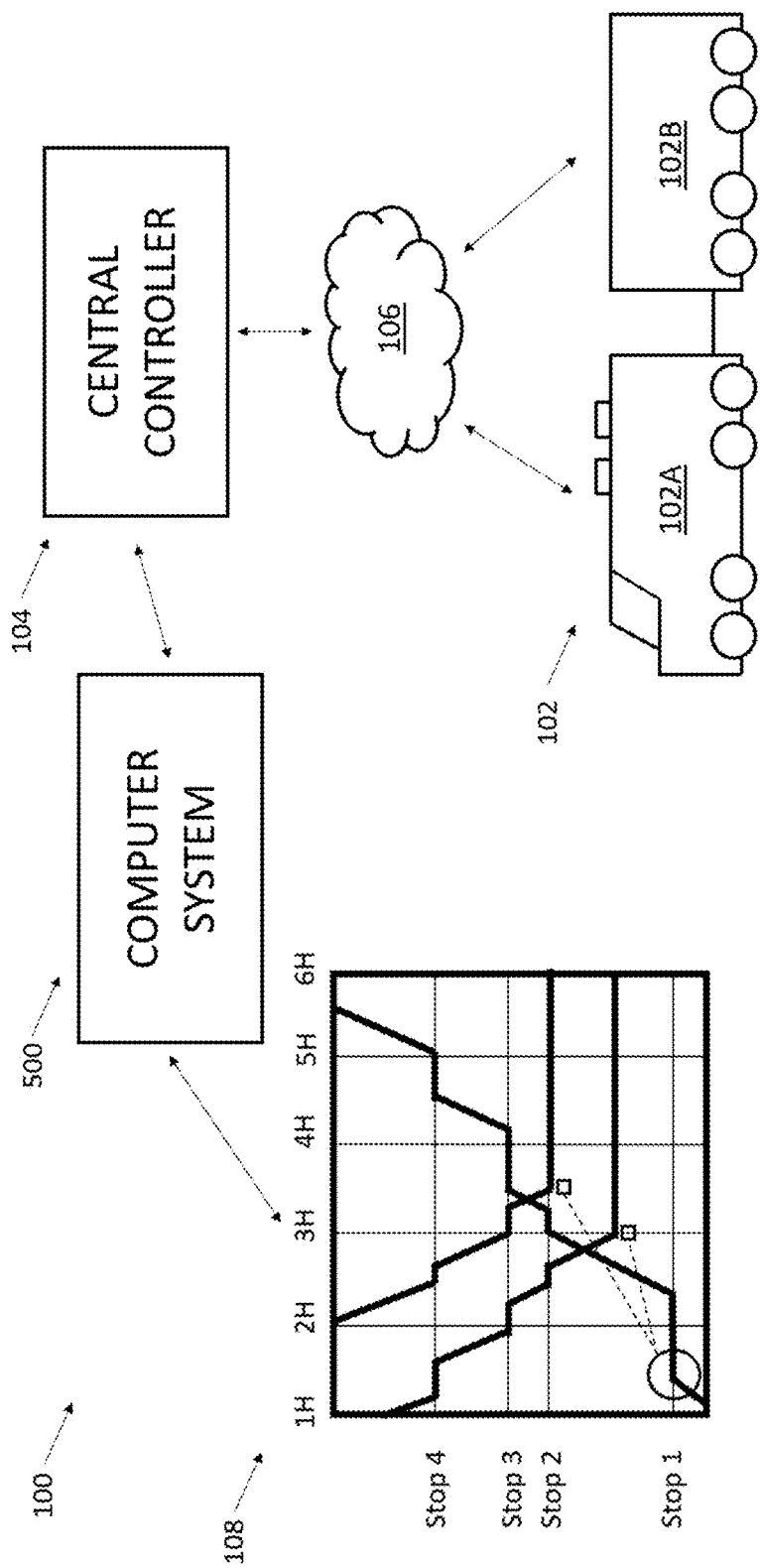
FIG. 1 illustrates a schematic of a system for determining a propagation of delays, in accordance with one or more examples of the present disclosure.

Referring to the figures, FIG. 1 illustrates a schematic of a system 100 for determining a propagation of delays. Generally, the system 100 includes a train fleet 102, a central controller 104, and a computer system 500. A train fleet 102 may be configured include a plurality of sensors configured to collect information relating to the status, operation, navigation, and potential stops of each individual train of the fleet 102, including both the locomotive 102A and the cargo 102B. The central controller 104 may be configured to receive, organize, and disperse information related to the fleet 102, the railways under operation, and the environment (i.e., weather, delays, rail condition) which the fleet 102 may operate. Generally, once collected, said information may be transferred to the central controller 104 via a wireless method 106 known in the art such as, but not limited to, WIFI, Bluetooth, cellular networks, or satellite communication. Alternatively, data collected by the train fleet 102 may be transferred in a traditional wired method as well, for example, when the train fleet 102 arrives at a destination. The central controller 104 may additionally be configured to receive and disperse information to and from a plurality of computer systems 500.

The computer system 500 may be configured to provide an operator or assessor with access to the information gathered by the fleet 102. The components and structure of the computer system 500 is discussed in greater detail with regards to FIG. 5 below. However, generally, the computer system 500 may be configured to receive and organize the information gathered by the central controller 104, display information via an output device, and accept user inputs via an input device.

In some embodiments, the computer system 500 may be configured to receive and organize information related to the navigation history of each individual train of the fleet 102. In particular, the computer system may generate and display, via the output device, a train navigation map 108 (such as an electronic train graph (ETG)), which displays the navigation of the fleet 102 across a common railway on a single graphic. To further explain the train navigation map 108, the vertical axis may represent distance, sidings, main locations, and the mainline while the horizontal axis may represent a time period, such that a position of a train a particular point in time may be ascertained.

Furthermore, the computer system 500 may be configured as to autonomously, or via an input by an operator, assess and analyze a totality of delays experienced by each train of the fleet 102. In further detail, each unexpected stop of a train may be classified as either a primary stop or a secondary stop. A primary stop may be defined as a stop which was caused by reason that is unrelated to or at no-fault of another train, while a secondary stop may be defined as a stop being caused by or as a result of a stop of another train. The computer system 500 may then be configured to determine a correlation between each primary stop and each secondary stop to determine which secondary stops were caused by which primary stops. Referring to the train navigation map 108 of FIG. 1, it can be appreciated that a primary stop is indicated by circle in the bottom left and subsequent the secondary stops which result from the primary stop are indicated by dashed lines and squares. Once a complete analysis of each primary and secondary stop is conducted, a totality of delays propagated from each primary stop may be calculated.

The description herein is directed towards systems and method for determining the propagation of delays that may occur due to unexpected stops that may occur during the operation of a fleet of train fleet 102. In particular, the methods and systems discussed herein may be focused on increasing the efficiency, accuracy, and consistency of determining the propagation across a plurality of fleets across a plurality of railways.

Figure 2:
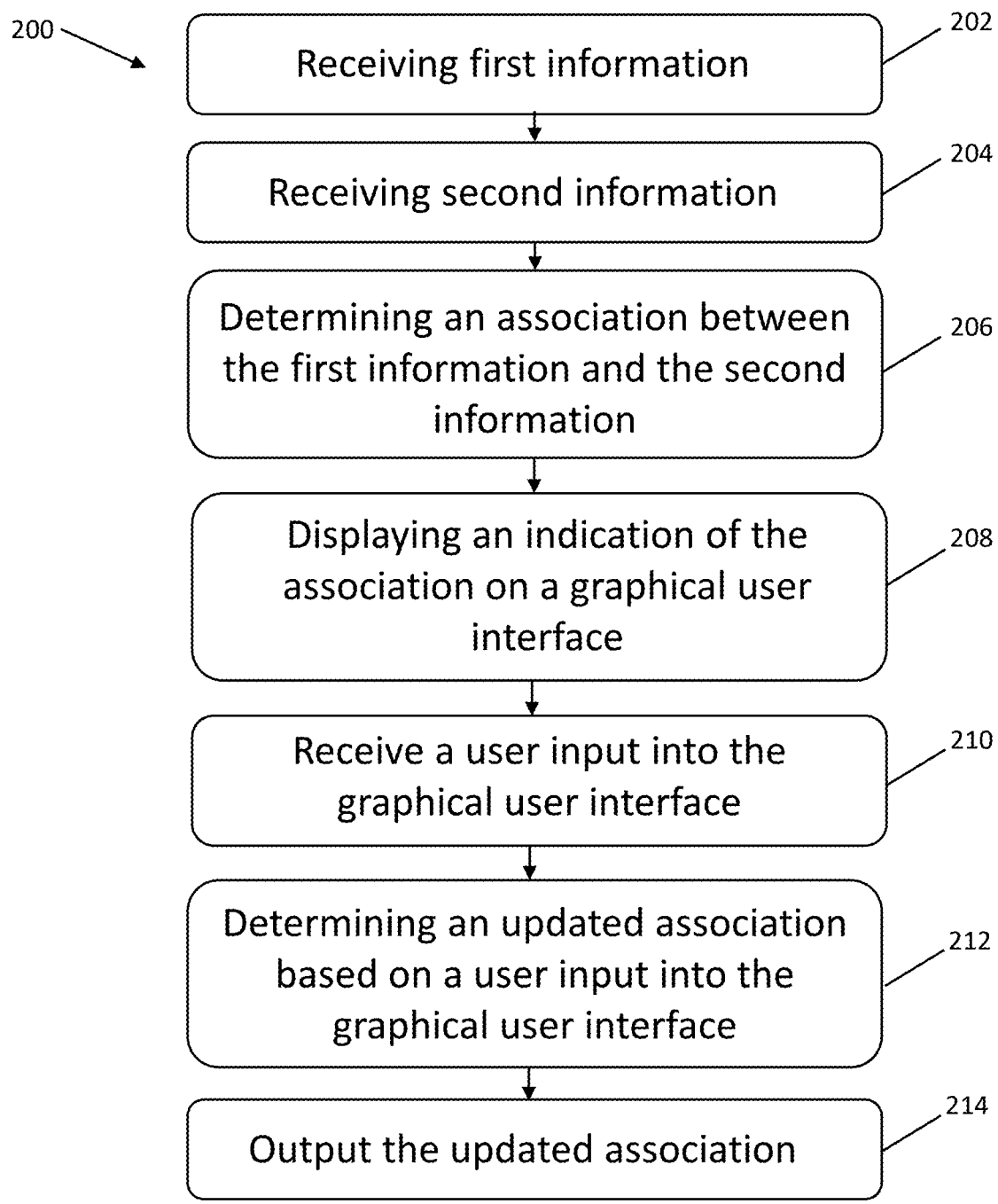
FIG. 2 illustrates a method for determining a propagation of delays, in accordance with one or more examples of the present disclosure.

FIG. 2 illustrates a method 200 for determining a propagation of delays that may occur on a single-track or a multi-track railway, in accordance with various examples of the subject matter disclosed herein. The method 200 and other processed described herein are illustrated using exemplary flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

As noted above, the method 200 may be used to determine a propagation of delays due to unplanned or unexpected train stops that may occur on a single-track railway or a multi-track railway. To explain further, a single-track railway is a line that is configured such that trains may travel in both directions while sharing a common singular track. Single-track railways may be used in situations where the rail line must cover long distances and the cost of construction and maintaining a second track may be prohibitive. In reference to FIG. 3, an exemplary diagram of a single-track railway 300 is depicted. The single-track railway 300 may include a mainline 312 which services the travel of trains in both directions. For exemplary purposes, the mainline 312 may be broken into two sections (e.g., mainline section 312A and mainline section 312B). For trains to pass one another, a plurality of sidings 314A-314C may be positioned along the length of the mainline 312. The distance between each siding may be varied based on the application and expected traffic of a section of the mainline. For further explanation, a first train 316 traveling in a first direction 322, a second train 318 traveling in a second direction 324 opposite the first direction 322, and a third train 320 traveling in the first direction 322 are depicted. As shown, the first train 316 is traveling along mainline section 312A heading towards mainline section 312B. The second train 318 is waiting on siding 314B waiting for the first train 316 to vacate mainline section 312A before proceeding in the second direction 324. Furthermore, the third train 320 is traveling along mainline section 312B. The depicted single-track railway 300 is merely for exemplary purposes and to assist in the description and explanation of the concepts discussed here and is not intended to be limiting to the scope or applications of the concepts described with reference to the present disclosure. Additionally, and as noted above, the systems and methods described herein may be used in conjunction with a multi-rail railway as well. For example, method 200 described herein may be used to determine a propagation of delays on a railway which may incorporate a plurality of mainlines traveling in a variety of directions.

The method 200 commences at step 202, where first information 524 related to at least one stop by at least one train on a first track is received or gathered by at least one sensor positioned on the at least one train and may be communicated to the computer system 500. In further detail, the first information 524 may include information related to a first stop by a train or a plurality of first stops by a plurality of trains. The first information 524 may include data related to the stop, including the time, the cause, the position, and the duration. Furthermore, the first information 524 may include data in relation to the environment in which the train stopped, for example, include information related to the weather (temperature, wind, precipitation, etc.), specifics of the details of the track (i.e., speed limit, topography, potential damaged areas), details related to the cars being hauled, positions of other trains and the like. Additionally, information related to the cargo of the train may be collected, for example, the type of load, the length of the load, the weight of the load, vehicle properties like frontal area, length, draft gear types, number of axles, total weight loaded, tare weight, brake system type and valves, brake shoe types. Additionally, information related to the train itself may be included, such as locomotive type and model and its traits like powertrain type, energy source and engine types, brake, energy recovery and auxiliary systems. Furthermore, as mentioned above, the first information 524 may include details or data related to individual stops of one or more trains or information related to a plurality of stops by one or more trains.

In some embodiments, the first information 524 may be gathered automatically by sensors positioned on the train or remotely from the train. The sensors may detect, sense, or otherwise determine a plurality of data points including, but not limited to, position, status of the locomotive, status of the cargo, environmental information, track information, as well as information related to the status of the train prior to the stop including, speed, acceleration, forces applied, position and status of the train's systems, etc. A variety of sensors may be deployed including, but not limited to, temperature sensors, pressure sensors, accelerometers, force sensors, image sensors, vibration sensors, etc.

In some instances, the stop or the plurality of stops associated with the first information 524 may, at the time of collection or during a manual or automatic post-processing process, be classified as a primary or initial stop. To explain further, the data incorporated within the first information 524 may indicate that the stop occurred for a reason unrelated to a stop of another train. For example, if the train was caused to stop due to a malfunction of the locomotive or cargo, an operator error, rail damage, weather delays, malfunction of railcars, failure or error within system communications, crew or operator related delays, damage to the locomotive or cargo, partial or complete derailments, etc. the stop may be classified as a primary or initial stop. In other words, the stop or plurality of stops associated with the first information 524 may be instances which originate a string of delays in subsequent trains which were intended to navigate the location of the primary stop. As noted earlier, the stops associated with the first information 524 may be manually classified by an engineer at the time of the stop or an operator reviewing the first information 524 or, in some embodiments, through an automatic process at the time of the stop or in a post-operative process such as an algorithm, classifying system, or machine learning process.

The method 200 continues at step 204, where a second information 526 related to at least one stop or a plurality of stops is received or gathered. Similar to the discussion of the first information 524 above, the second information 526 may include information related to a stop by a train or a plurality of stops by a plurality of trains. In some instances, the stop or the plurality of stops associated with the second information 526 may, at the time of collection or during a post-processing process, be classified as a secondary or subsequent stop. To explain further, the data incorporated within the second information 526 may indicate that the stop occurred as a result of a stop of another train. For example, if the train was scheduled to travel down a mainline of a railway but the mainline was occupied by a stopped train, the stop may be classified as a secondary stop. In other words, the stop or plurality of stops associated with the second information 526 may be instances of a propagation of delays which occurred because of a primary stop. A secondary stop may be classified by an engineer at the time of the stop or by an operator reviewing the second information 526 or, in some embodiments, through an automatic process at the time of the stop or in a post-operative process such as an algorithm, classification system, or machine learning process.

Similarly to the first information 524, the second information 526 may include data related to each stop associated with the second information 526, including the time, the cause, the position, and the duration. Furthermore, the second information 526 may include data in relation to the environment in which the train stopped, for example, include information related to the weather (temperature, wind, precipitation, etc.), specifics of the details of the track (i.e., speed limit, topography, potential damaged areas), details related to the cars being hauled, positions of other trains and the like. Additionally, information related to the cargo of the train may be collected, for example, the type of load, the length of the load, the weight of the load, vehicle properties like frontal area, length, draft gear types, number of axles, total weight loaded, tare weight, brake system type and valves, brake shoe types. Additionally, information related to the train itself may be included, such as locomotive type and model and its traits like powertrain type, energy source and engine types, brake, energy recovery and auxiliary systems. Furthermore, as mentioned above, the second information 526 may include details or data related to individual stops of one or more trains or information related to a plurality of stops by one or more trains.

Furthermore, the second information 526 may be gathered automatically by sensors positioned on the train or remotely from the train. The sensors may detect, sense, calculate, or otherwise determine a plurality of data points including, but not limited to, position, status of the locomotive, status of the cargo, environmental information, track information, as well as information related to the status of the train prior to the stop including, speed, acceleration, forces applied, position and status of the train's systems, etc. A variety of sensors may be deployed including, but not limited to, temperature sensors, pressure sensors, accelerometers, force sensors, image sensors, vibration sensors, etc. Additionally, the second information 526 may be manually collected by an operator of the train or a controller of the train's operations. For example, if a stop were to occur, an operator may fill out a form or input digitally into a computer's system to provide more detailed feedback regarding the cause and circumstances surrounding the stop.

Additionally, in some embodiments, information pertaining to a plurality of non-classified stops may be collectively grouped together and, through a post-processing procedure, may be classified into first information 524 and second information 526 based on the nature of each stop. For example, information pertaining to stops that occurred a section of rail during the course of a time period may be easier to collect and group instead of classifying each stop at the time of the stop. As noted earlier, the bulk information may be put through a post-processing process which manually, via an operator, or automatically, via a classifying system, computer system, or machine learning algorithm, may individually classify each stop based on the information associated with the stop such as the time, the cause, the position, and/or the duration of the stop.

In some embodiments, further information may be received or gathered in addition to the first information 524 and the second information 526. For example, third information and fourth information may additionally be received or gathered. The additional information may be related to the stops described within the first information 524 and/or the second information 526, may be related to additional stops that may be geographically or temporally different from those detailed in the first information 524 and the second information 526, or may be related to extraneous circumstances or conditions of the single-track railway 300 such as weather, track conditions, existing delays, etc.

The method 200 continues at step 206, where at least one association 528 between the first information 524 and the second information 526 may be determined by an operator and/or the computer system 500. In some embodiments, the at least one association 528 may compare the reason, position, and/or duration of each stop contained within the first information 524 against the reason, position, and/or duration of each stop contained within the second information 526. As noted above, in some embodiments, each stop detailed within the first information 524 may be classified as a primary stop, which is a stop caused by reason that is unrelated to or at no-fault of another train. Additionally, each stop detailed within the second information 526 may be classified as a secondary stop, with each stop being caused by or as a result of a stop of another train. Therefore, the at least one association 528 may look to attribute the duration of each secondary stop associated with the second information 526 to at least one of the primary stops detailed within the first information 524. In other words, step 206 may review each primary stop associated with the first information 524 and attempt to determine which secondary stops associated with the second information 526 occurred as a result. Therefore, the at least one association 528 may attribute the duration of each secondary stop associated with the second information 526 to none, one, or a plurality of the primary stops associated with the first information 524 in an attempt to pinpoint the totality of delays caused by each primary stop.

Figure 3:
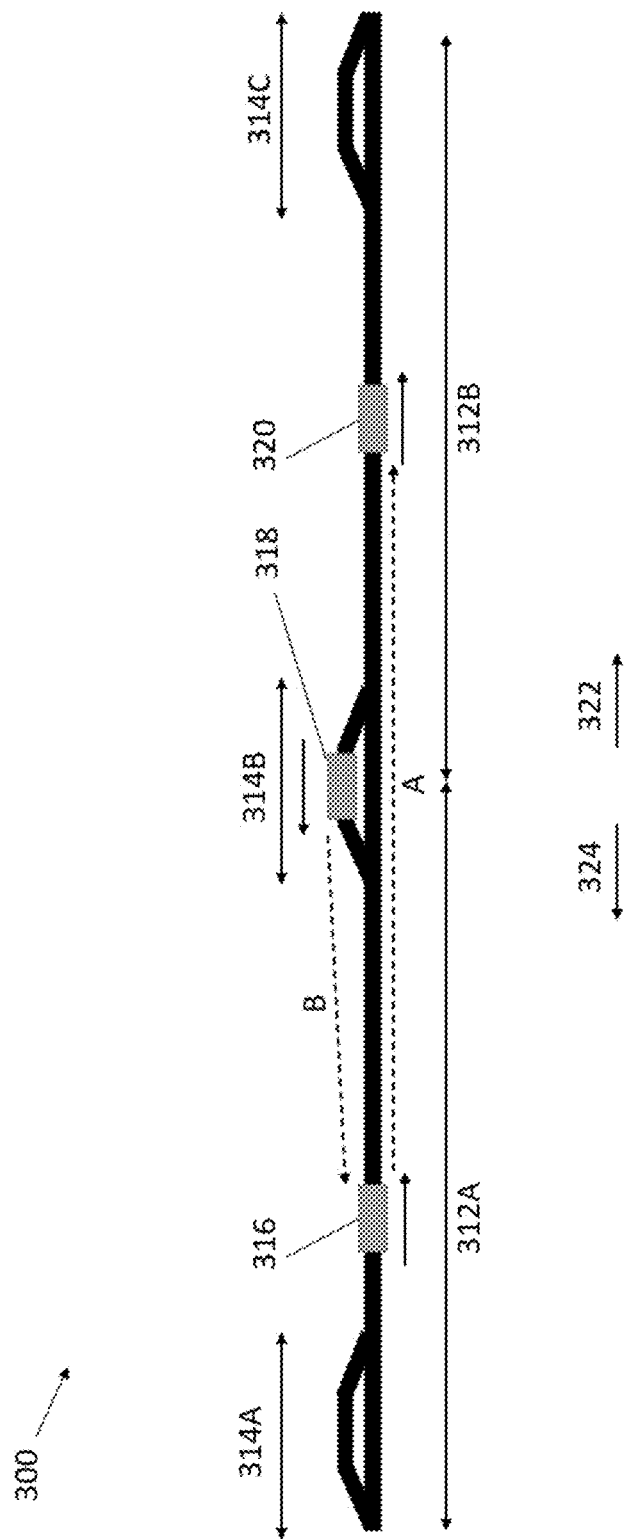
FIG. 3. illustrates an exemplary environment for discussing a propagation of delays, in accordance with various example of the presently disclosed subject matter.

To further explain how an association 528 may be determined during step 206, FIG. 3 will now be referenced again. In this example, the third train 320 may depict a primary stop with information related to the reason, position, and/or duration contained within the first information 524. Additionally, the first train 316 and the second train 318 may depict secondary stops with information related to the reason, position, and/or duration of the secondary stops within the second information 526. In such an embodiment, the third train 320 may be stopped on mainline section 312B for a reason not related to another train, for example, via a malfunction. The first train 316 may be traveling along mainline section 312A towards mainline section 312B, however, due to the stop of the third train 320, the first train 316 cannot progress onto mainline section 312B and, therefore, is required to stop. In such an instance, an association 528 A may be created between the first information 524 related to the primary stop of the third train 320 and the second information 526 related to the secondary stop of the first train 316. In particular, the at least one association 528 may attribute at least a portion of the duration of the secondary stop of the first train 316 to the primary stop of the third train 320. In other words, the created association 528 may attribute causation of the secondary stop of the first train 316 to the reason from the primary stop of the third train 320.

Furthermore, the second train 318 is positioned on siding 314B waiting for the first train 316 to vacate mainline section 312A so that the second train 318 may proceed down mainline section 312A. However, due to the stopped first train 316, the second train 318 cannot proceed. Therefore, an association 528 B may be made between the second information 526 related to the secondary stop of the second train 318 and the second information 526 related to the secondary stop of the first train 316. However, since the stop of the first train 316 is a secondary stop, created association 528 B may propagate forward and attribute at least a portion of the duration of the secondary stop of the second train 318 to the primary stop of the third train 320.

In some embodiments, step 206 may create at least one association 528 in which a duration of a secondary stop is associated with a plurality of primary stop. In other words, the second stop of a train may be caused by more than one primary stop. For example, in reference back to FIG. 3, the first train 316 may conduct a secondary stop due to the primary stop of the third train 320 and, subsequently, the second train 318 may conduct a secondary stop as a result of the secondary stop of the first train 316. However, it is envisioned that the reason for primary stop of the third train 320 may be remedied such that the third train 320 continues down mainline section 312B. If the first train 316 experiences further delays for a reason not related to the stop of another train, for example due to a component malfunction or operator error, the stop of the first train 316 may transition from being classified as a secondary stop to a primary stop. In such an instance, a portion of the duration of the secondary stop of the second train 318 may be attributed to both the primary stop of third train 320 and the portion of the stop of the first train 316 which is classified as a primary stop. In other words, a portion of the duration of the secondary stop of the second train 318 may be associated with both the primary stop of first train 316 and the primary stop of the third train 320. Furthermore, it is envisioned that a percentage of the duration of the secondary stop may be attributed to each primary stop, for example, 5 percent, 10 percent, 15 percent, 20 percent, 25 percent, 30 percent, 35 percent, 40 percent, 45 percent, 50 percent, 65 percent, 70 percent, 75 percent, 80 percent, 85 percent, 90 percent, 95 percent, etc. may be attributed to a primary stop.

As noted above, in some Furthermore, determining causation may be additionally complex in certain instances. For example, referring to FIG. 3, in the event the second train 318 conducted a primary stop on siding 314B, the travel of both the first train 316 and the third train 320 may be unimpeded due to the primary stop, however, the inability to use the siding 314B may cause for the overall schedule of subsequent trains to be affected. In other words, the primary stop of the second train 318 may effectively turn mainline section 312A and mainline section 312B into a singular section. Therefore, in such an embodiment, the primary stop of the second train 318 may create a plurality of delays and therefore, at least one association 528, between the primary stop and the subsequent plurality of secondary stops. In particular, by attributing a plurality of small durations to the primary stop of the second train 318. In such instances where the effects of a primary stop may not be readily apparent, it may be beneficial to compare each resulting secondary stop associated with the second information 526 to each primary stop associated with the first information 524 to determine if there may be an association 528.

In some embodiments, a primary stop of a train may lead to additional expenses beyond the duration of the secondary stop. For example, if during a secondary stop, the train experiences damage or additional delays due to vandalism, weather conditions, or other unexpected damages, etc., an association 528 may be created between the secondary stop and the primary stop attributing the additional expenses incurred to the primary stop.

As noted previously, the environment depicted in FIG. 3 is merely exemplary and is used to assist in the description and explanation of concepts discussed herein and is not intended to be limiting to the scope or applications of the concepts described with reference to the present disclosure. Furthermore, the example discussed above in relation to step 206 is also merely exemplary and is intended to assist in the description of the concepts discussed herein and is not intended to limit the scope of the methods described in relation to method 200 or, more particularly, step 206. Additionally, it is envisioned within the scope of this disclosure that any number of main lines, sidings, and/or number of trains may be included. Furthermore, any number of primary and secondary stops may be experienced by a singular train or a plurality of trains. For example, a singular train may experience a plurality of secondary stops and primary stops within duration of its journey.

In some embodiments, the at least one association 528 between the first information 524 and the second information 526 may be determined manually, semi-automatically, or automatically. For example, in some embodiments and using traditional methods, a user may manually compare each stop detailed in both the first information 524 and the second information 526 to determine an association 528 between the duration of each secondary stop and each primary stop based on their knowledge and experience. As mentioned previously, this traditional method of operator-based propagation analysis may rely heavily upon the operator's personal opinion and knowledge, possibly creating inconsistencies in the results produced.

Further, it is envisioned, that step 206 may be performed semi-automatically or automatically through the use of a computer system and an algorithm such as machine learning model, a neural network, table, linear model, non-linear model, deep neural networks, or other methods known in the art. Further, the algorithm may be generated or refined using one or more techniques known in the art, such as, but not limited to, supervised learning, unsupervised learning, deep learning, reinforcement learning, or evolutionary algorithms. A detailed description of the use and training of an algorithm to perform step 206 of method 200 is provided below in relation to method 400 and FIG. 4.

The method 200 continues at step 208, where an indication of the at least one association 528 determined in step 206 between the first information 524 and the second information 526 is displayed on a computer system 500. In some embodiments, the computer system 500 may include a graphical user interface which may incorporate an output device(s) 518 which may be configured to display an indication of at least one association 528 such that a user may review or view the at least one association 528.

The output device(s) 518 may include any output devices known in the art, such as a display (e.g., a liquid crystal or thin-film transistor (TFT) display), a touchscreen, speakers, a vibrating mechanism, or a tactile feedback mechanism. Thus, the output device(s) 518 can include a screen or display. The output device(s) 518 man also include speakers, or similar devices, to play sounds or ringtones when an audio call or video call is received. Output device(s) 518 can also include ports for one or more peripheral devices, such as headphones, peripheral speakers, or a peripheral display. Additional discussion of the components of the computer system 500 are described below in reference to FIG. 5.

The method 200 continues at step 210, where a user input is received by the graphical user interface of the computer system 500. In some embodiments, a user may review the displayed indication of the at least one association 528 between the first information 524 and the second information 526 of step 208 and input feedback, suggestions, or changes to the at least one association 528 into the graphical user interface of the computer system 500. The graphical user interface may incorporate an input device(s) 520 which may be configured to accept inputs from a user which may modify, approve, or delete displayed indications of the at least one association 528 or, in some embodiments, create new associations.

The input device(s) 520 may include any input devices known in the art. For example, the input device(s) 520 may include a camera, a microphone, or a keyboard/keypad. The input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device(s) 520 and an output device(s) 518.

The method continues at step 212, where at least one updated association 530 is determined based on a user input into the graphical user interface of the computer system 500. As discussed above with reference to step 210, a user may view an indication of the at least one association 528 created in step 206 and interact with the input device(s) 520 graphical user interface of the computer system 500 to edit, approve, create, or delete the indications of the at least one association 528. In some embodiments, it is envisioned that the changes to the indications of the at least one association 528 may be displayed in real-time on the output device(s) 518, such that a user may view the edited, approved, created, and deleted indications. Once complete, the inputted user review may then be used to alter the at least one association 528 between the first information 524 and the second information 526 such that at least one updated association 530 may be created.

The method 200 continues at step 214, where the at least one updated association 530 between the first information 524 and the second information 526 is outputted. As noted earlier, the at least one association 528 may represent a propagation of delays which extend from each primary stop associated with the first information 524. In other words, the duration of each secondary stop, or delays experienced, may then be attributed via the at least one updated association 530 to one or more of the primary stops. In some embodiments, the at least one updated association 530 may be output in a report which details the propagation of delays which each primary stop causes. Additionally, the reasoning associated with each primary stop may place additional causation on the actor or circumstances which led to the stop. For example, if the rail was damaged, the railway may be attributed causation, or, if the locomotive experiences a malfunction, the locomotive owner, the IT systems provider, the communication systems provider, the rail car owner, the crew provider, or the railway owner or operator may be blamed.

Figure 4:
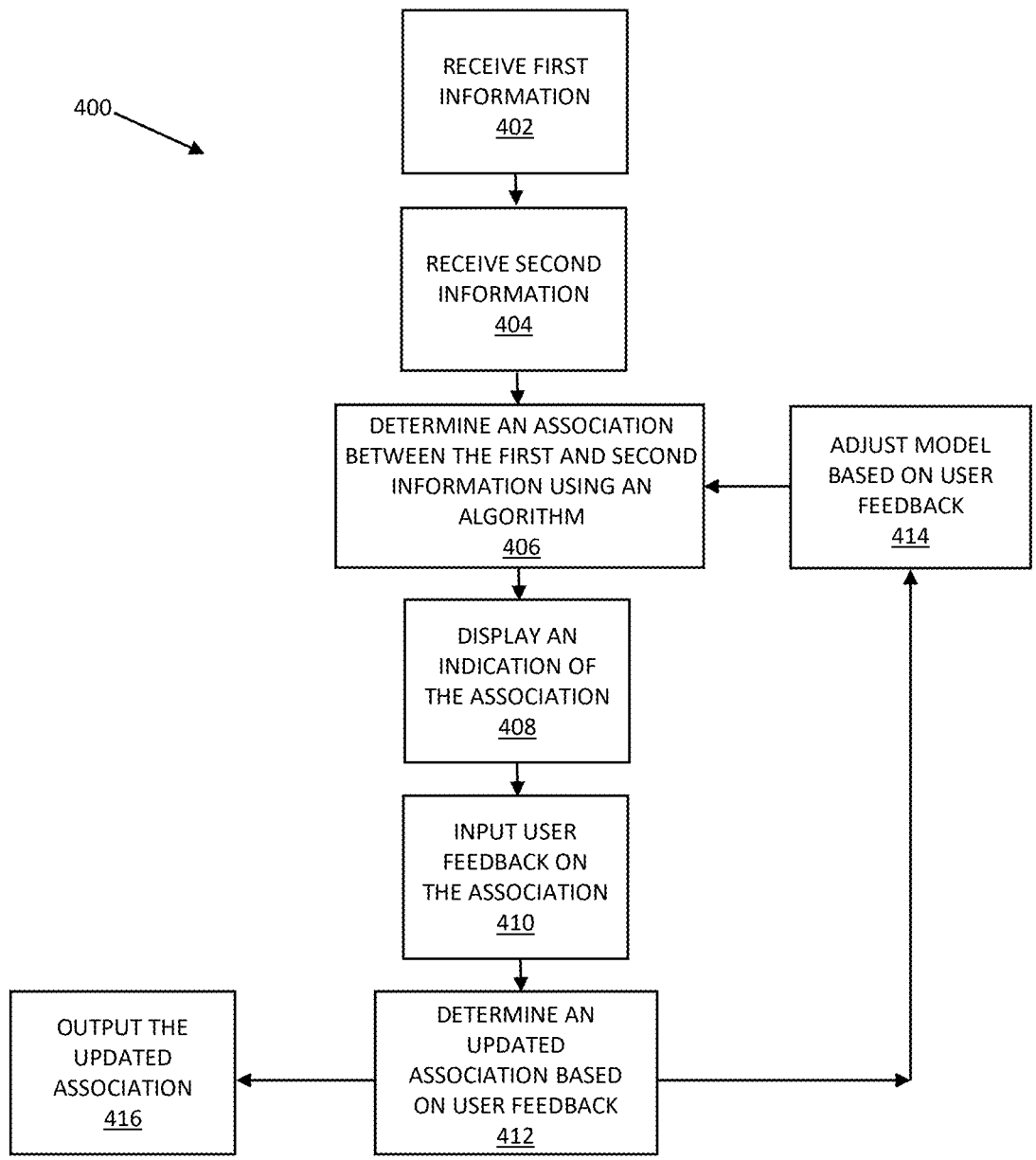
FIG. 4 illustrates a method for determining a propagation of delays using an algorithm, in accordance with one or more examples of the present disclosure.

Now in reference to FIG. 4, which a method 400 for determining a propagation for delays using an algorithm, in accordance with various examples of the presently disclosed subject matter. The method 400 and other processes described herein are illustrated as an example flow graph, each operation of which may represent a sequence of operation that can be implemented in hardware, software, or a combination thereof. In the context of software, the operations may represent computer-executable instructions including routines, programs, objects, components, data structure, and the like that perform particular functions or implement particular abstract data types. The order in which the operations are described may be combined or executed in any order and/or in parallel to implement the processes.

The method 400 commences at steps 402-404 where first information 524 and second information 526 are received. Similarly to method 200, step 402 and step 404 are substantially similar to step 202 and 204.

The method 400 continues at step 406, where at least one association 528 between the first information 524 and the second information 526 may be determined using a computer system 500 and an algorithm. As mentioned in accordance with step 406 of which the at least one association 528 determined in relation to step 406 are substantially similar, the at least one association 528 may compare the reason, position, and/or duration of each stop contained within the first information 524 against the reason, position, and/or duration of each stop contained within the second information 526. As noted above, in some embodiments, each stop detailed within the first information 524 may be classified as a primary stop, which is a stop caused by reason that is unrelated to or at no-fault of another train. Additionally, each stop detailed within the second information 526 may be classified as a secondary stop, with each stop being caused by or as a result of a stop of another train. Therefore, the at least one association 528 may look to attribute the duration of each secondary stop associated with the second information 526 to at least one of the primary stops detailed within the first information. In other words, step 206 may review each primary stop associated with the first information 524 and attempt to determine which secondary stops associated with the second information 526 occurred as a result. As a result, the at least one association 528 may attribute the duration of each secondary stop associated with the second information 526 to none, one, or a plurality of the primary stops associated with the first information 524.

Step 406 uses an algorithm to automatically or semi-automatically determines at least one association 528 between the first information 524 and the second information 526. As mentioned previously, the algorithm may take the form of a machine learning model, a neural network, table, linear model, non-linear model, deep neural networks, or other methods known in the art. Further, the algorithm may be generated or refined using one or more techniques known in the art, such as, but not limited to, supervised learning, unsupervised learning, deep learning, reinforcement learning, or evolutionary algorithms. In some embodiments, the algorithm may be generated or trained using various training such as, but not limited to, existing operator data, structured data of previous runs, or data from simulated runs. Such data may be used in methods known in the art including, but not limited to, imitation learning, learning by demonstration, mimic learning, etc.

In some embodiments, the algorithm may be adjusted or trained based on human feedback, which is described in further detail in relation to step 410. The algorithm may receive the first information 524 and the second information 526 as inputs. In particular, information such as the time, cause, position, duration of each stop associated with either the first information 524 or the second information 526 may be received by the algorithm. The algorithm may be executed by the computer system 500, resulting in at least one association 528 to be outputted being calculated and output from the algorithm.

The method 400 continues at step 408-410, where an indication of the at least one association 528 determined by step 406 is displayed on the graphical user interface of the computer system 500 and a user may review the indication and provide an input into the graphical user interface of the computer system 500. Steps 408-410 are substantially similar to step 208 and 210 as described in relation to method 200 above.

The method 400 continues at step 412, where at least one updated association 530 based on the user input of step 410 is determined. Similar to step 412 of method 400, a user may view an indication of the least one association 528 created in step 406 and interact with the input device 520 graphical user interface of the computer system 500 to edit, approve, create, or delete the indications of the at least one association 528. In some embodiments, it is envisioned that the changes to the indications of the at least one association 528 may be displayed in real-time on the output device(s) 518, such that a user may view the edited, approved, created, and deleted indications. Once complete, the inputted user review may be used to alter the at least one association 528 between the first information 524 and the second information 526 such that at least one updated association 530 may be created. Step 412 is substantially similar to step 212 of method 200 as discussed above. Further, the updated association 530 determined in conjunction with step 412 may be forwarded to both steps 414 and 416.

The method 400 continues at step 414, where the at least one updated association 530 may be used to train or adjust the algorithm used in step 406. In other words, the user feedback provided in accordance with 410 may be relied upon to review the algorithm's outputs and provide feedback to the algorithm to further increase performance in future iterations. Based on this feedback and the at least one updated association 530, the algorithm may be altered to better accommodate or emphasize the nature of the feedback. For example, an operator may place an increased importance on weather conditions when determining causation, however, the algorithm may have a decreased importance. In other embodiments, an operator may alter a primary stop to a secondary stop or vice versa, determine that a secondary stop may be too far removed either in distance or temporary, from the assigned primary stop, or may amend or alter the chain of causation between each of the primary stop and the secondary stops. To do so, during step 410, the operator may edit the indication of the least one association 528 to reflect their understanding and experience to result in the at least one updated association 530.

The at least one updated association 530 may then be used to train the model using a variety of methods known in the art including, but not limited to, imitation learning, behavioral cloning, mimic learning, supervised learning, semi-supervised learning, or learning from demonstration to encourage the algorithm to mirror the expected actions of a user. Furthermore, the at least one updated association 530 may be used in a reinforcement model to alter or change the desired reward structure through methods such as, but not limited to, reinforcement learning, inverse reinforcement learning reward shaping, curriculum learning, or multi-objective optimization. The adjust or updated algorithm may then be inputted into step 406 so that future executions of method 400 may use a more efficient and/or accurate model.

The method 400 concludes at step 416, where the at least one updated association 530 between the first information 524 and the second information 526 is outputted. Similarly to the output described in step 214, the at least one association 528 may represent a propagation of delays which extend from each primary stop associated with the first information 524. In other words, the duration of each secondary stop, or delays experienced, may then be attributed via the at least one updated association 530 to one or more of the primary stops. In some embodiments, the at least one updated association 530 may be output in a report which details the propagation of delays which each primary stop causes.

Figure 5:
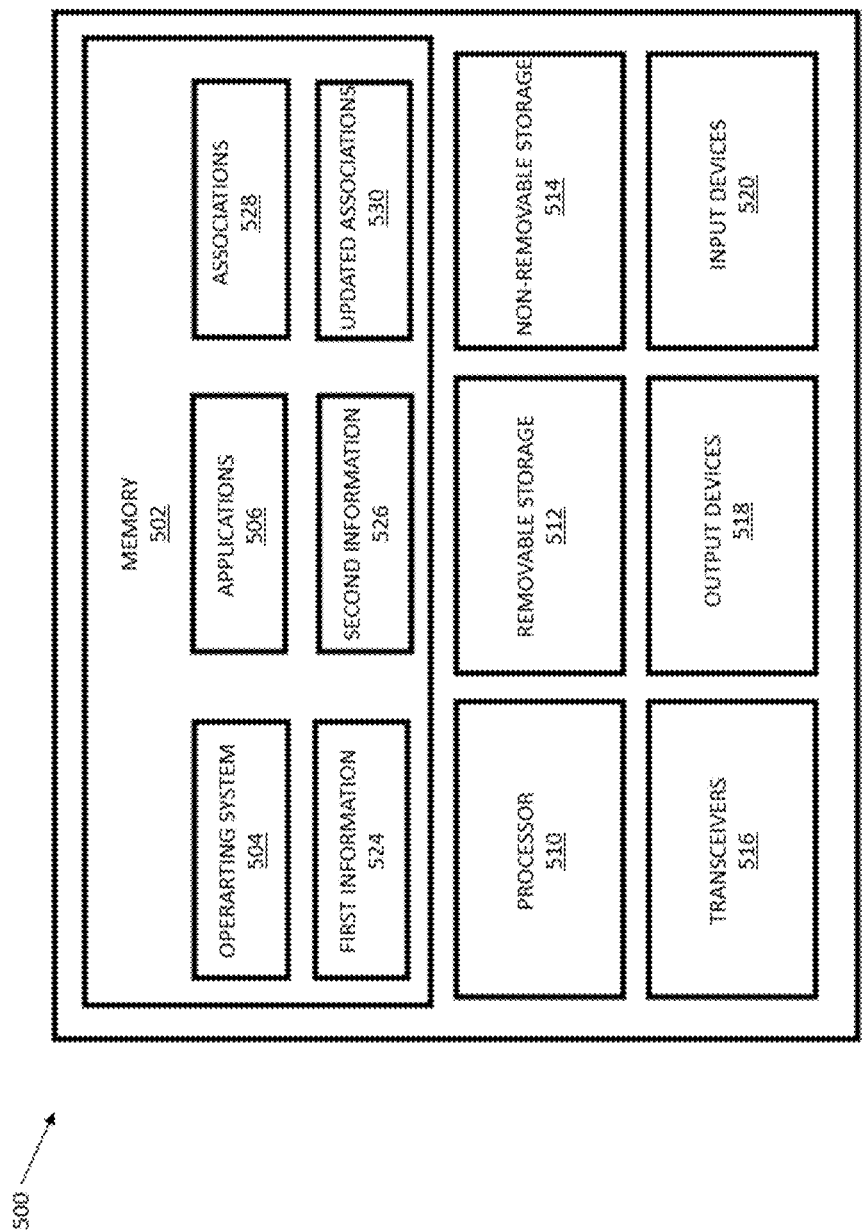
FIG. 5 depicts a component level view of an engine controller for use with the systems and methods described herein, in accordance with various examples of the presently disclosed subject matter.

FIG. 5 depicts a component level view of the computer system 500 for use with the systems and methods described herein, in accordance with various examples of the presently disclosed subject matter. The computer system 500 could be any device capable of providing the functionality associated with the systems and methods described herein. The computer system 500 can include several components to execute the above-mentioned functions. The computer system 500 may be comprised of hardware, software, or various combinations thereof. As discussed below, the computer system 500 can comprise memory 502 including an operating system (OS) 504 and one or more standard applications 506. The standard applications 506 may include applications that modify, edit, create, or delete data associated with the first information 524, the second information 526, at least one association 528, or at least one updated association 530.

In some embodiments, it is envisioned that a plurality of computer systems 500 may be used to execute the methods described herein, accept the inputs, and display the outputs. Furthermore, each of these plurality of computer systems 500 may be configured to be in communication via components and structures described herein. However, it is additionally envisioned that a singular computer system may be used to execute the methods and functions described herein.

The computer system 500 can also include one or more processor(s) 510 and one or more of removable storage 512, non-removable storage 514, transceiver(s) 516, output device(s) 518, and input device(s) 520. In various implementations, the memory 502 can be volatile (such as random-access memory (RAM)), non-volatile (such as read only memory (ROM), flash memory, etc.), or some combination of the two. The memory 502 can include data pertaining to the first information 524, the second information 526, the at least one association 528, and the at lease on updated association 530.

The memory 502 can also include the OS 504. The OS 504 varies depending on the manufacturer of the computer system 500. The OS 504 contains the modules and software that support basic functions of the computer system 500, such as scheduling tasks, executing applications, and controlling peripherals. The OS 504 can also enable the computer system 500 to send and retrieve other data and perform other functions, such as communicating, receiving, or parsing the first information 524, the second information 526, the at least one association 528, and the at least one updated association 530.

The computer system 500 can also comprise one or more processor(s) 510. In some implementations, the processor(s) 510 can be one or more central processing units (CPUs), graphics processing units (GPUs), both CPU and GPU, or any other combinations and numbers of processing units. The computer system 500 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the computer system 500. Any such non-transitory computer-readable media may be part of the computer system 500 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the computer system 500 and other possible computer systems), the Internet, and/or an intranet. Specifically, the transceiver(s) 516 can include one or more transceivers that can enable the computer system 500 to send or receive the first information 524, the second information 526, the at least one association 528, and the at least one updated association 530. Thus, the transceiver(s) 516 can include multiple single-channel transceivers or a multi-frequency, multi-channel transceiver to enable the computer system 500 to send and receive video calls, audio calls, messaging, etc. The transceiver(s) 516 can enable the computer system 500 to connect to multiple networks including, but not limited to 2G, 3G, 4G, 5G, and Wi-Fi networks. The transceiver(s) 516 can also include one or more transceivers to enable the computer system 500 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the computer system 500 to facilitate audio and video calls, download files, access web applications, and provide other communications associated with the systems and methods, described above.

In some implementations and as discussed above, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device(s) 520 and an output device(s) 518. Additionally, and as mentioned above, the input device(s) 520 and the output device(s) 518 may be combined into a graphical user interface which may be used to execute the methods described herein.

INDUSTRIAL APPLICABILITY

The present disclosure related generally to methods and systems for determining the propagation of delays that may occur on a single-track railway. In some embodiments, an algorithm is used in conjunction with a computer system 500 to determine at least one association 528 between a set of first information 524 and a set of second information 526. As mentioned previously, the first information 524 may contain data related to at least one primary stop, which is a stop that may occur due to no fault of another train. Additionally, the second information 526 may contain data related to at least one secondary stop, which is a stop that may occur as a result of a primary stop. Each at least one association 528 may attempt to determine if the duration of a secondary stop may be attributed to one of the primary stops. The algorithm may efficiently and consistently create each association 528, however, during the training process, the algorithm may be incorrect, inefficient, or otherwise outputting results outside of what may be excepted from a typical operator. Therefore, an operator may review the at least one outputted association 528 of the algorithm such that at least one updated version of the association 530 may be created that harnesses the experience of the operator with the efficiency of the model. The updated version of the association 530 may be outputted as well as utilized to train future versions of the algorithm.

Due to the complex nature of determining causation between stops, traditional methods typically relied upon manual methods where an operator would, by-hand, trace the propagation of delays stemming from each primary stop. This method is inefficient and results in inconsistent analysis, as each operator may rely upon their own personal experience and training to analyze each stop. Therefore, there exists a want for a method which results in both an efficient and uniform method. By leveraging the experience and knowledge of the operators, the algorithm may be refined using methods described herein to increase the overall robustness, accuracy, and efficiency of future versions of the algorithm.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed:

1. A computer system for determining a propagation of delays, the computer system comprising:
  a processor;
  a non-transitory computer readable medium that stores instructions that when executed by the processor causes the processor to execute operations comprising:
    receiving first information related to a first stop by a first train on a first track, wherein the first information includes a reason for the first stop;
    receiving second information related to a second stop by a second train on the first track, wherein the second information includes a duration of the second stop;
    determining an association between the duration of the second stop of the second train and the reason for the first stop of the first train;
    displaying an indication of the association on a graphical user interface; and
    determining an updated association between the duration of the second stop of the second train and the first stop of the first train based on a user input into the graphical user interface.

2. The computer system of claim 1, wherein determining an association includes using an algorithm to determine the association between the duration of the second stop of the second train and the reason for the first stop of the first train.

3. The computer system of claim 2, wherein the operations further comprises training the algorithm using the updated association.

4. The computer system of claim 3, wherein the operations further comprises determining a trained association between the duration of the second stop of the second train and the first stop of the first train using the trained algorithm.

5. The computer system of claim 4, wherein the operations further comprises:
  receiving third information related to a third stop of a third train on the first track, wherein the third information includes a reason for the third stop;
  receiving fourth information related to a fourth stop of a fourth train on the first track, wherein the fourth information includes a duration of the fourth stop;
  determining a trained association between the duration of the fourth stop and the reason for the third stop; and
  displaying an indication of the trained association on a graphical user interface.

6. The computer system of claim 1, the operations further comprising preparing a report indicating the updated association between the duration of the second stop and the first stop.

7. The computer system of claim 1, wherein the association between the duration of the second stop of the second train and the reason for the first stop of the first train includes a percentage of the duration of the second stop caused by the first stop.

8. The computer system of claim 7, wherein the percentage of the duration of the second stop caused by the first stop is less than fifty percent.

9. The computer system for determining a propagation of delays of claim 1, the operations further comprising:
receiving third information related to a third stop of a third train on the first track, wherein the third information includes a duration of the third stop;
determining a second association between the duration of third stop of the third train and the reason for the first stop of the first train;
displaying an indication of the second association between the duration of the third stop of the third train and the first stop of the first train on the graphical user interface simultaneously with the indication of the association between the duration of the second stop of the second train and the first stop of the first train; and
determining a second updated association between the duration of the third stop of the second train and the first stop of the first train based on a second user input into the graphical user interface.

10. The computer system of claim 9, wherein:
the association between the duration of the second stop of the second train and the reason for the first stop of the first train includes a first percentage of the duration of the second stop caused by the first stop; and
the second association between the duration of the third stop of the third train the reason for the first stop of the first train includes a second percentage of the duration of the third stop caused by the first stop.

11. The computer system of claim 10, wherein the first percentage of the duration of the second stop caused by the first stop and the second percentage of the duration of the third stop caused by the first stop are less than fifty percent.

12. A computer-implemented method for determining a propagation of delays, the method comprising:
receiving first information related to a first stop by a first train on a first track, wherein the first information includes a reason for the first stop;
receiving second information related to a second stop by a second train, wherein the second information includes a duration of the second stop on the first track;
determining an association between the duration of the delay of the second stop of the second train and the reason of the first stop of the first train;
displaying an indication of the association on a graphical user interface; and
determining an updated association between the duration of the delay of the second stop of the second train and the reason of the first stop of the first train based on a user input into the graphical user interface.

13. The computer-implemented method of claim 12, wherein determining an association includes using an algorithm to determine the association between the duration of the second stop of the second train and the reason for the first stop of the first train.

14. The computer-implemented method of claim 13 further comprising:
receiving third information related to a third stop of a third train on the first track, wherein the third information includes a reason for the third stop;
receiving fourth information relation to a fourth stop of a fourth train on the first track, wherein the fourth information includes a duration of the fourth stop;
determining a trained association between the duration of the fourth stop and the reason for the third stop; and
displaying an indication of the trained association on a graphical user interface.

15. A computer system for determining a propagation of delays, the computer system comprising:
a processor;
a non-transitory computer readable medium that stores instructions that when executed by the processor causes the processor to execute operations comprising:
receiving first information related to a plurality of first stops by a first plurality of trains on a first track, wherein the first information includes a reason for each of the first stops;
receiving second information related to a plurality of second stops by a second plurality of trains on the first track, wherein the second information includes a duration of each of the second stops;
determining at least one association between the reason for each of the plurality of first stops and the duration of at least one second stop of the plurality of second stops;
displaying an indication of the at least one association on a graphical user interface; and
determining at least one updated association between the plurality of first stops and the duration of at least one second stop of the plurality of second stops based on a user input into the graphical user interface.

16. The computer system of claim 15, determining at least one association includes using an algorithm to determine the at least one association between the reason for each of the plurality of first stops and the duration of at least one second stop of the plurality of second stops.

17. The computer system of claim 16, wherein the operations further comprises:
training the algorithm using the at least one updated association; and
determining at least one trained association between the duration of the at least one second stop of the plurality of second stops and each of the plurality of first stops using the trained algorithm.

18. The computer system of claim 17, wherein the operation further comprises:
receiving third information related to a plurality of third stops by a third plurality of trains on a first track, wherein the third information includes a reason for each of the third stops;
receiving fourth information related to a plurality of fourth stops by a fourth plurality of trains on the first track, wherein the fourth information includes a duration of each of the fourth stops;
determining at least one trained association between the duration of at least one reason for each of the third stops of the third plurality of trains and the duration of at least one fourth stop of the fourth plurality of trains; and
displaying an indication of the at least one trained association on the graphical user interface.

19. The computer system of claim 18, the operations further comprising preparing a report indicating the at least one trained association between the duration of at least one reason for each of the third stops of the third plurality of trains and the duration of at least one fourth stop of the fourth plurality of trains.

20. The computer system of claim 15, wherein the at least one association includes a first association and a second association, and wherein the graphical user interface is configured to display an indication of the first association and an indication of the second association simultaneously.

* * * * *